Figure 1:
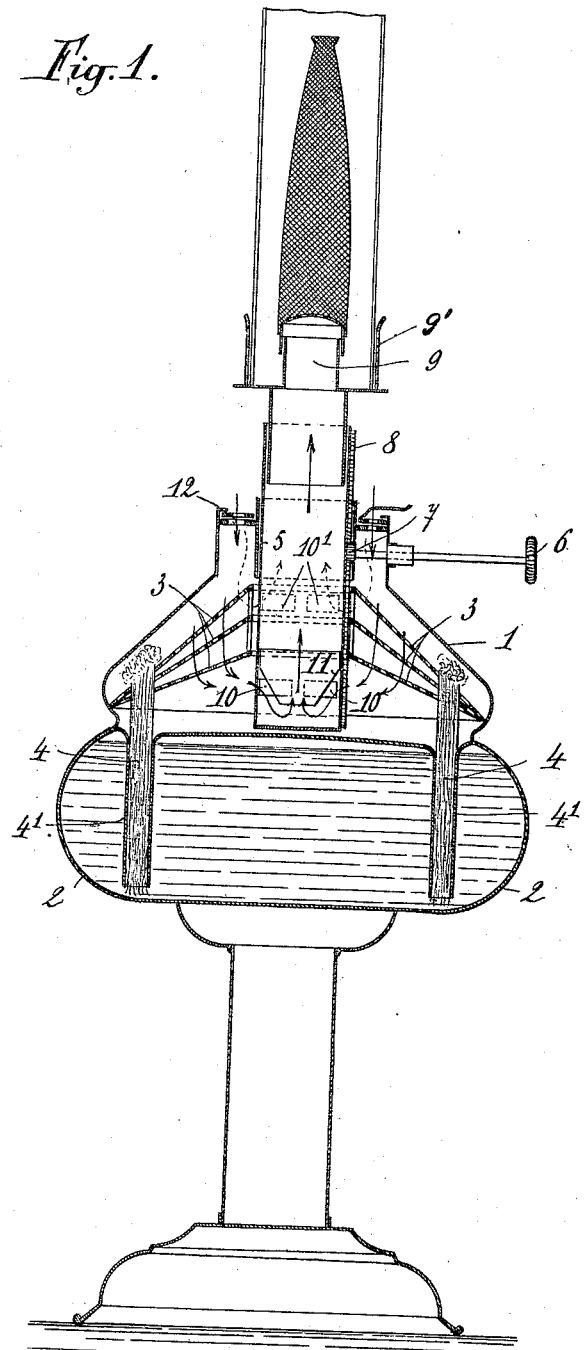

O. DEPREZ & A. RICHIR.
CARBURETER.
APPLICATION FILED JAN. 30, 1909.

994,985.

Patented June 13, 1911.
2 SHEETS—SHEET 1.

WITNESSES

INVENTORS

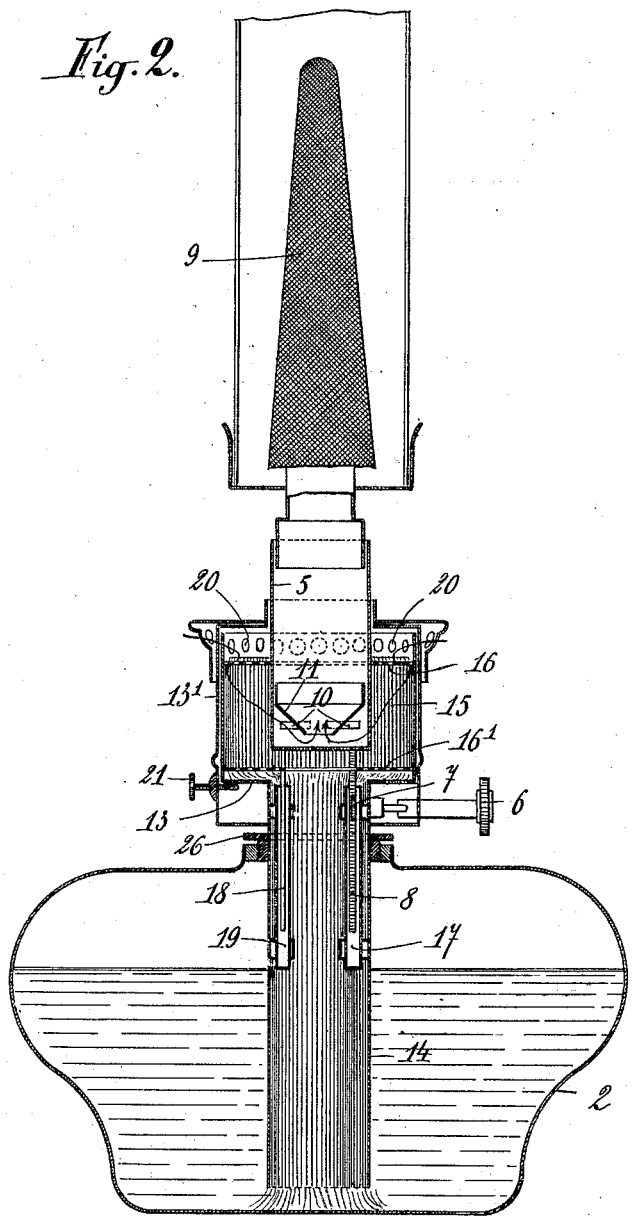

UNITED STATES PATENT OFFICE.

OSCAR DEPREZ AND ARMAND RICHIR, OF BRUSSELS, BELGIUM.

CARBURETER.

994,985.

Specification of Letters Patent. Patented June 13, 1911.

Application filed January 30, 1909. Serial No. 475,208.

*To all whom it may concern:*

Be it known that we, OSCAR DEPREZ and ARMAND RICHIR, subjects of the King of Belgium, residing at 42 Rue du Beau Site, Brussels, Belgium, have invented a new and useful Carbureter for Lighting, Heating, and other Purposes; and we do hereby declare the following to be a full, clear, and exact description of the same.

In all known forms of carbureters the carburization of the air is regulated either by varying the quantity of fresh air admitted to the carbureter or by varying the quantity of fresh air mixed to the carbureted air or by varying both of these at one and same time. These methods of regulating have this disadvantage that the carbureted air is never perfectly homogeneous with the natural consequence that the working of the apparatus in which this carbureted air is utilized is necessarily defective. In the system of carburization described in the present invention, this disadvantage is completely done away with. In fact, in this system, the control of the carburization is obtained by forcing the air to traverse a more or less large quantity of the saturated mass contained in the carbureter. According to this system the quantity of air admitted to the carbureter remains constant. It is the degree of carburization which varies besides which no fresh air is allowed to mix with the carbureted air. It follows from this that the carbureted air thus produced is perfectly homogeneous. This control is obtained by means of a movable element which can be readily fixed into position. This movable element forms part of the burner so that any change in its position has the effect of either bringing the burner and the carbureter nearer together or increasing the distance between them, thus more or less favoring the carburization by the heat emitted by the burner.

The annexed drawings show by way of example, the application of the apparatus for lighting purposes.

Figure 1 is the vertical section of a lamp showing one form of application of the invention; Fig. 2 is a vertical section of a lamp showing another form of application of the invention.

The apparatus shown in Fig. 1 consists of a carbureter arranged over a reservoir 2 containing volatile hydrocarbon such as gasolene. In the carbureter screens 3 are made of cotton, rough linen cloth or other material of large mesh through which the oil is sucked by means of wicks 4, contained in the tubes 4′ plunged into the oil almost to the bottom of the reservoir 2. These screens or linen cloths 3 are arranged on a framework of iron wire for instance, in which a central space is left for the passage of a tube 5 by means of which the carburization is regulated. This tube can be moved up and down vertically by means of a small handle 6 on the axle of which is a small pinion 7 working in a rack 8 fixed on the said tube. To the upper extremity of the tube 5 is attached the burner 9 of the lamp while the lower extremity is closed, and at a certain distance above the closed end of the tube holes are drilled which put the interior of the tube 5 in communication with the carbureter chamber. A cone shaped piece 11 open at both ends communicates on the cylindrical side with the tube 5 at a slight distance above the openings 10 while the conical end extends somewhat below the openings 10 and terminates at a short distance from the bottom of the tube 5.

The working of the apparatus is as follows: According to the draft induced by a heated body, such as a match, which may be introduced into the chimney of the lamp through an opening in the gallery 9′ of the burner, the air is drawn into the carbureter through the openings 12, and as indicated by the arrows, it passes through the screens or linen-cloths 3 where it becomes carbureted in contact with the volatile hydrocarbon with which the said cloths are impregnated, enters the tube 5 through the openings 10, descends to the bottom of this tube, then ascends by the tube 11 and the tube 5 and arrives finally at the burner 9 where it becomes inflamed and burns bringing the mantle into a state of incandescence.

In order to regulate the carburization in such a way as to obtain a good incandescence of the mantle, the movable organ or tube 5 can be moved up or down as explained above. In the position which the tube occupies in Fig. 1 the air is obliged to pass through all the screens or linen cloths 3 and it becomes carbureted in the highest degree. On the other hand if by turning the handle 6 the tube 5 is moved upward so that the openings 10 take up a new position 10′, shown by dotted lines, the outside air drawn in through the openings 12 will only pass through one screen, the upper cloth, as shown by the dotted arrows. The degree of carburization will consequently be diminished because the air only passes through a very small portion of the saturated mass. It can be seen therefore that the carburization can be readily regulated by simply changing the position of the tube 5. The tube 5 forming part of the burner, it should be noted that any change in its position has the effect of either bringing the burner and the carbureter nearer together or increasing the distance between them, thus more or less favoring the carburization by the heat emitted by the burner in proportion as the carburization is to be more or less actively accelerated. The manipulation therefore of the tube 5 exercises a double influence on the process of carburization. To put out the lamp it is only necessary to raise the openings 10 of the tube 5 above the level of the uppermost cloth of the carbureter so as to arrest the process of carburization. It is obvious that in the form of application described above nothing is absolute. Instead of employing for instance only three screens or saturated linen cloths a much larger number may be employed.

In the case of Fig. 2, the carbureter is independent of the lamp; the screens or cloths of the preceding example may be replaced by wire-netting, cotton meshes or other suitable substance, which are stretched between two frames and prolonged toward the bottom in a tube introduced into the volatile hydrocarbon reservoir. This carbureter is so combined that it can be easily adapted to any kind of lamp without its being necessary to transform the latter in any way. Its working is identical with that described above, i. e. that the control of the carburization is also obtained by means of a movable tube forcing the air to pass through a more or less large quantity of the mass of saturated oil. The carbureter is composed of a cylinder 13 open at the top, the lower end of which forms a tube which extends into the volatile hydrocarbon reservoir 2, onto which it is screwed by means of a threaded ring 26. Another cylinder 13′ is keyed on, closed at the top but provided with an aperture in the center through which the movable tube 5 can be passed. The inside of this chamber contains the saturated mass. This latter consists of threads or meshes of cotton or other substance 15 stretched vertically between two circular frames 16 and 16′, the lower ends of which hang down through the tube 14 to the bottom of the reservoir for the purpose of sucking up the volatile hydrocarbon. The apertures 20 in the cylinders 13 and 13′ constituting the carbureter chamber, permit of the admission of air into the latter. These openings can be closed by turning the outer cylinder 13′ upon the inner cylinder 13. To prevent the cylinder 13′ being lifted up vertically through the change in its position a screw 21 is provided for this purpose. The adjustable tube 5 is identical with that shown in the apparatus Fig. 1 and is controlled exactly in the same manner by means of a small handle 6. The rack 8 fixed to the tube 5 is inclosed in a mantle or tube 17 fixed to the tube 14 in such a way that the said rack can be raised or lowered without throwing into disorder the meshes or threads 15 which are contained in the tube 14. In order to guide the tube 5 when changing its position it is furnished with a rod 18 sliding in a tube 19 fixed to the tube 14. As already stated, the working of this apparatus is absolutely the same as that of the apparatus previously described. The air enters the carbureter through the openings 20, circulates freely, as indicated by the arrows, through the circumferential space of the framework 16 and according to the position of the openings 10 of the movable tube 5, this air licks the threads or meshes 15 to a greater or lesser distance from the upper part of the framework 16.

Claims:

1. A carbureter for lighting, heating or other purposes, comprising, in combination, a series of screens, wicks connected with said screens, a reservoir containing volatile hydrocarbon, and in which the said wicks plunge, a movable member passing through the middle of said screens closed at its lower end, and having perforations for allowing the entrance of carbureted air, a burner carried by said movable member, an open inverted cone inside of said movable member, and means for moving vertically the movable member and the burner attached thereto.

2. A carbureter for lighting, heating and other purposes, comprising, in combination, a cylindrical chamber, a screening means made of cotton, or the like, the elements of which are stretched vertically inside of said chamber, a wick formed by the lower ends of said screening elements, a tube containing said wick, and supporting the chamber, a reservoir containing volatile hydrocarbon and in which said wick and tube plunge, a movable member located in the middle of said chamber, and having perforations for allowing the entrance of carbureted air, a burner carried by said movable member, an open inverted cone, inside of said movable member, and means for moving vertically the movable member and the burner attached thereto.

3. A carbureter comprising a cylindrical chamber, a screening means, the elements of which are stretched vertically inside of said chamber, a wick formed by the lower ends of said elements, a tube containing said wick, a reservoir containing hydrocarbon into which the tube extends, a movable member located in the middle of the chamber and having a closed bottom and openings in its walls and means for moving vertically said member.

In testimony whereof, we have signed our names to this specification in the presence of two subscribing witnesses.

OSCAR DEPREZ.
ARMAND RICHIR.

Witnesses:
GREGORY PHELAN,
JAMES McFAY.